United States Patent
Chen et al.

(10) Patent No.: US 10,635,987 B1
(45) Date of Patent: Apr. 28, 2020

(54) SYSTEM FOR IMPROVING USER SENTIMENT DETERMINATION FROM SOCIAL MEDIA AND WEB SITE USAGE DATA

(71) Applicant: STATE FARM MUTUAL AUTOMOBILE INSURANCE COMPANY, Bloomington, IL (US)

(72) Inventors: Jerry Chen, Champaign, IL (US); Gary Foreman, Champaign, IL (US); Justin Loew, Champaign, IL (US); Ayush Kumar, Edwards, IL (US); Joseph Antonetti, Champaign, IL (US)

( * ) Notice: Subject to any disclaimer, the term of this patent is extended or adjusted under 35 U.S.C. 154(b) by 667 days.

(21) Appl. No.: 15/340,539

(22) Filed: Nov. 1, 2016

Related U.S. Application Data

(60) Provisional application No. 62/249,414, filed on Nov. 2, 2015.

(51) Int. Cl.
| | |
|---|---|
| *G06N 7/00* | (2006.01) |
| *H04L 12/58* | (2006.01) |
| *G06Q 30/00* | (2012.01) |
| *G06N 20/00* | (2019.01) |
| *G06Q 50/00* | (2012.01) |

(52) U.S. Cl.
CPC .............. *G06N 7/005* (2013.01); *G06N 20/00* (2019.01); *G06Q 30/01* (2013.01); *H04L 51/32* (2013.01); *G06Q 50/01* (2013.01)

(58) Field of Classification Search
CPC ........ G06N 7/005; G06N 20/00; G06Q 30/01; G06Q 50/01; H04L 51/32
USPC ............................................................. 711/12
See application file for complete search history.

(56) References Cited

U.S. PATENT DOCUMENTS

| | | | |
|---|---|---|---|
| 7,249,312 B2* | 7/2007 | Jasper .................... | G06F 16/35 |
| | | | 715/205 |
| 2013/0110928 A1* | 5/2013 | Ghosh .................... | G06Q 50/01 |
| | | | 709/204 |
| 2013/0132851 A1* | 5/2013 | Konopniki .......... | G06F 16/9535 |
| | | | 715/736 |
| 2014/0074728 A1* | 3/2014 | Margulies .............. | G06Q 30/01 |
| | | | 705/304 |
| 2014/0207525 A1* | 7/2014 | Dandekar .............. | G06Q 50/01 |
| | | | 705/7.35 |
| 2014/0249873 A1* | 9/2014 | Stephan ............... | G06Q 10/063 |
| | | | 705/7.11 |

(Continued)

*Primary Examiner* — Shane D Woolwine
(74) *Attorney, Agent, or Firm* — Marshall, Gerstein & Borun LLP

(57) ABSTRACT

A method and system for improving analysis of social media and other usage data to determine user sentiments are disclosed. Social media posts are identified as relevant to determining user sentiments regarding a service provider. Posts are analyzed by machine learning algorithms to determine user general sentiments and specific sentiments. User interaction metrics indicating user interaction with service provider web site or application may also be analyzed. Sentiment and interaction determinations may be used with other data to predict likelihood of user attrition for services of the service provider. Sentiment determinations associated with social media posts may further be used to determine priority levels for the posts, including response urgency levels. Determined priority levels may then be used to implement appropriate actions in a timely manner based upon the post urgency.

20 Claims, 9 Drawing Sheets

(56) References Cited

U.S. PATENT DOCUMENTS

2016/0253688 A1\* 9/2016 Nielsen .............. G06Q 30/0202
705/7.31

\* cited by examiner

SYSTEM FOR IMPROVING USER SENTIMENT DETERMINATION FROM SOCIAL MEDIA AND WEB SITE USAGE DATA

CROSS-REFERENCE TO RELATED APPLICATIONS

This application claims the benefit of U.S. Provisional Application No. 62/249,414, filed Nov. 2, 2015, the entirety of which is hereby incorporated herein by reference.

TECHNICAL FIELD

The present disclosure generally relates to a system and a method for improved collection and processing of usage data from users of social media, web site, or applications to determine user sentiments.

BACKGROUND

Social media platforms such as Twitter® and Facebook® have introduced new means of quasi-public communication that are both nearly instantaneous and readily searchable. Various tools have been developed to enable users to search social media posts for content, but these tools only facilitate searching content expressly included within each post or metadata directly connected with each post. Tools are needed to enable entities, particularly service providers, to recognize latent user sentiments associated with posts. User sentiments provide an important context to social media posts (such as urgency), but no tools currently exist to determine user sentiments from social media posts. Additionally, service providers frequently suffer customer attrition without notice when customer sentiment towards the service providers becomes negative. Tools for determining customer sentiments are also needed by to enable service providers to reduce attrition and retain customers.

SUMMARY

The present application discloses methods, systems, and computer-readable media storing instructions for improving the speed and accuracy of assessing data associated with a user to determine a likelihood of attrition with respect to the user's use of one or more services provided by a service provider. This may include determining or predicting a likelihood of user attrition based upon the data. To predict or determine the likelihood of user attrition, data associated with the user may be collected and processed. The data may include social media posts associated with the user, as well as web site or application usage of the user. Social media posts may be searched to identify references associated with the service provider or other content of interest, such as price-related information. In some embodiments, content related to user sentiments may be extracted from the social media posts of the user and analyzed to determine one or more user sentiments, which may include general user sentiment and/or a specific user sentiment relating to the service provider or a competitor service provider. In further embodiments, content related to user price sensitivity may similarly be identified in social media posts associated with the user and analyzed to determine a metric of price sensitivity of the user. Data regarding user interaction with a web site or application of the service provider may further be monitored and recorded to determine a user purpose of the user interaction with the web site or application. Additional data associated with the user may be collected in some embodiments, such as information regarding user location, age, service history (generally or with the service provider), or current service contracts or policies with the service provider (e.g., contract duration, service terms, quality metrics, insurance premiums, discounts, renewal options, etc.). The collected or determined data may be further analyzed to determine a likelihood of user attrition, i.e. a likelihood that the user will discontinue service with the service provider. In some embodiments, the service provider of interest may be a competitor service provider, from which the user currently receives a service.

Analysis of the collected data may include analysis using machine learning algorithms or techniques. In some embodiments, models used to analyze some or all of the collected data may be generated using supervised or unsupervised machine learning algorithms. Such models may be generated using one or more sets of training data having known properties, and may be verified using the same or additional sets of training data. The resulting models may be stored for use in analyzing data associated with a user.

In further embodiments, relevant social media posts by one or more users may be identified and analyzed using a model of sentiments in social media posts. Based upon such analysis, priority levels may be determined for each of the social media posts. Such priority levels may indicate both the quality of the sentiment expressed (such as positive, negative, neutral, etc.) and the urgency of the sentiment expressed (such as normal, high, immediate, etc.). The determined priority levels may then be used to determine appropriate responses to the one or more social media posts. Such responses may include directing the post to a customer service representative or agent for action, providing automatically generated content to the user, or causing advertisements to be presented to the user. The selection of an appropriate response may depend upon both the determined priority level associated with a social media post and whether the user is a current customer of the service provider.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

As used herein, the term "user" may include an actual user of a computing device or social media platform, which user may include a customer or potential customer of a service provider. Also as used herein, the term "service provider" may include any entity providing services to customers, clients, or policyholders. Service providers may include insurers providing one or more insurance services, such as vehicle insurance, property insurance, health insurance, life insurance, or other types of insurance.

System Overview

Figure 1:
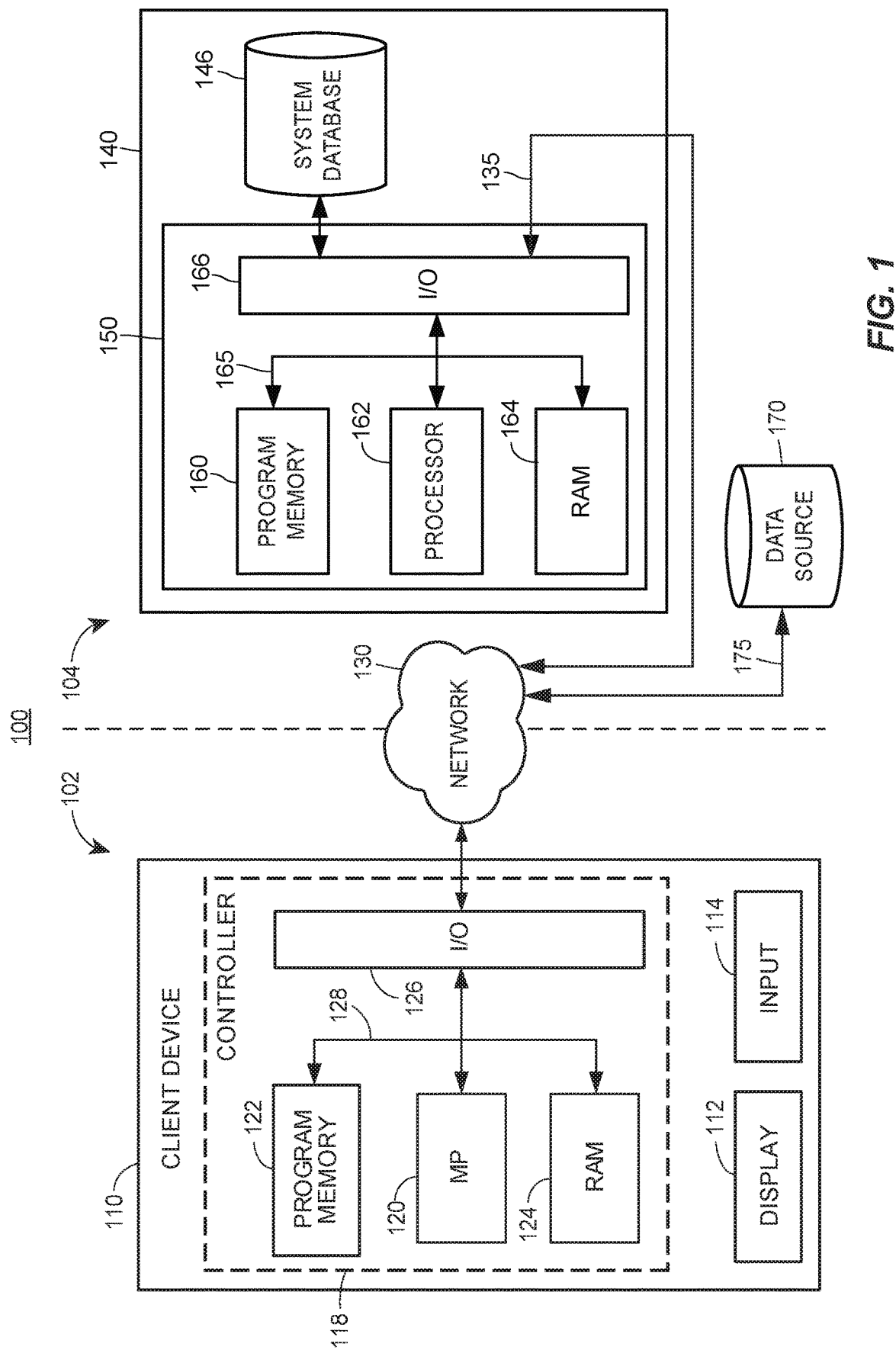
FIG. 1 illustrates a block diagram of an exemplary user sentiment assessment system on which the methods described herein may operate in accordance with the described embodiments.

FIG. 1 illustrates a block diagram of an exemplary user sentiment assessment system 100. The high-level architecture includes both hardware and software applications, as well as various data communications channels for communicating data between the various hardware and software components. The user sentiment assessment system 100 may be roughly divided into front-end components 102 and back-end components 104. The front-end components 102 allow a user to interact with various social media platforms, web sites, or applications via a client device 110. The front-end components 102 may communicate with the back-end components 104 via a network 130. The back-end components 104 may include one or more data sources 170 that may be connected to the front-end components 102 via the network 130 via link 175. Such data sources 170 may include social media platforms, web sites, application databases, cloud storage, or other network-connected data stores. The back-end components 104 may further include one or more servers 140 that may process the data provided by the front-end components 102 and/or data sources 170. The one or more servers 140 may use data from one or more of the client device 110 or data source 170 to determine user sentiments, estimate user price sensitivity, predict user actions, or cause appropriate remedial actions to be taken, as described further herein. The server 140 may be owned, operated, maintained, or used by a service provider (such as an insurer) or a party acting on behalf of the service provider to process information, receive and generate communications, and store and retrieve information. The server 140 may request or receive information from one or more data sources 170 via the network 130, which data may be stored with data provided directly by the client device 110 in a system database 146 communicatively connected to the server 140.

The front-end components 102 may be disposed within one or more client devices 110, which may include a desktop computer, notebook computer, netbook computer, tablet computer, or mobile device (e.g., a cellular telephone, smart phone, wearable computer, etc.). The client device 110 may include a display 112, an input 114, and a controller 118. In some embodiments, the client device 110 may further include a Global Positioning System (GPS) unit (not shown) to determine a geographical location of the client device 110. The input 114 may include a "soft" keyboard that is displayed on the display 112 of the client device 110, an external hardware keyboard communicating via a wired or a wireless connection (e.g., a Bluetooth keyboard), an external mouse, or any other suitable user-input device. The input 114 may further include a microphone, camera, or other input device capable of receiving information. The controller 118 includes one or more microcontrollers or microprocessors (MP) 120, a program memory 122, a RAM 124, and an I/O circuit 126, all of which may be interconnected via an address/data bus 128. The program memory 122 may include an operating system, a data storage, a plurality of software applications, and a plurality of software routines.

The program memory 122 may include software applications, routines, or scripts for implementing communications between the client device 110 and the server 140 or the data source 170 via the network 130. For example, the program memory 122 may include a web browser program or application, thereby enabling the user to access web sites via the network 130. As another example, the program memory 122 may include a social media application that receives data from and sends data to a data source 170 via the network 130. The program memory 122 may further store computer-readable instructions for a program or application associated with a service provider, which may provide access to information associated with a user account of the user of the client device 110.

In some embodiments, the controller 118 may also include, or otherwise be communicatively connected to, other data storage mechanisms (e.g., one or more hard disk drives, optical storage drives, solid state storage devices, etc.) that reside within the client device 110. It should be appreciated that although FIG. 1 depicts only one microprocessor 120, the controller 118 may include multiple microprocessors 120. Similarly, the memory of the controller 118 may include multiple program memories 122 or multiple RAMs 124. Although the FIG. 1 depicts the I/O circuit 126 as a single block, the I/O circuit 126 may include a number of different types of I/O circuits. The controller 118 may implement the program memories 122 or the RAMs 124 as semiconductor memories, magnetically readable memories, or optically readable memories, for example.

In some embodiments, the front-end components 102 may communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 may include one or more servers 140 communicatively connected to the network 130 by a link 135. Each server 140 may include one or more processors 162 adapted and configured to execute various software applications and components of the system 100, in addition to other software applications. The server 140 may further include a database 146, which may be adapted to store data related to the system 100, such as image objects, images associated with the objects, and information regarding the image objects. The server 140 may access data stored in the database 146. The server 140 may have a controller 150 that is operatively connected to the database 146. It should be noted that, while not shown, additional databases may be linked to the controller 150 in a known manner. The controller 150 may include a program memory 160, a processor 162, a RAM 164, and an I/O circuit 166, all of which may be interconnected via an address/data bus 165. As with the controller 118, it should be appreciated that although only one microprocessor 162 is shown, the controller 150 may include multiple microprocessors 162. Similarly, the memory of the controller 150 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. In some embodiments, the client device 110 may operate as a thin client device, wherein substantially all of the processes that would be implemented at the client device 110 may be executed at or directed by a server (not shown) communicatively connected to the client device 110 via the network 130.

The server 140 may further include a number of software applications or routines stored in a program memory 160. In some embodiments, these applications or routines may form modules when implemented by the processor 162, which modules may implement part or all of the methods 400-900 described herein. In some embodiments, such modules may include one or more of a configuration module, an analysis module, or a response module. In further embodiments, the various software applications may include a web server application responsible for generating data content to be included in web pages, including web pages sent from the server 140 to the client device 110.

The back-end components 104 may further include one or more data sources 170, communicatively connected to the network 130 via link 175. The data sources 170 may include public or proprietary databases including information that may be associated with the user, such as social media platforms operated by third parties. For example, a data source 170 may include a web site, directory, list, bulletin board, feed, or stream containing posts by or associated with the user. Additionally, or alternatively, the data sources 170 may include databases maintained by a service provider or other entity that operates, controls, or administers the server 140 on behalf of the service provider. A user may launch a client application on the client device 110 to communicate with the data source 170. Additionally, the user may launch or instantiate any other suitable user interface application (e.g., via a web browser). Similarly, one or more servers associated with the data source 170 may implement one or more programs, routines, applications, or modules to communicate with the client device 110 to receive or transmit user data, such as messages or posts. In some embodiments, the data source 170 may further execute software programs or applications as a web server.

Figure 2:
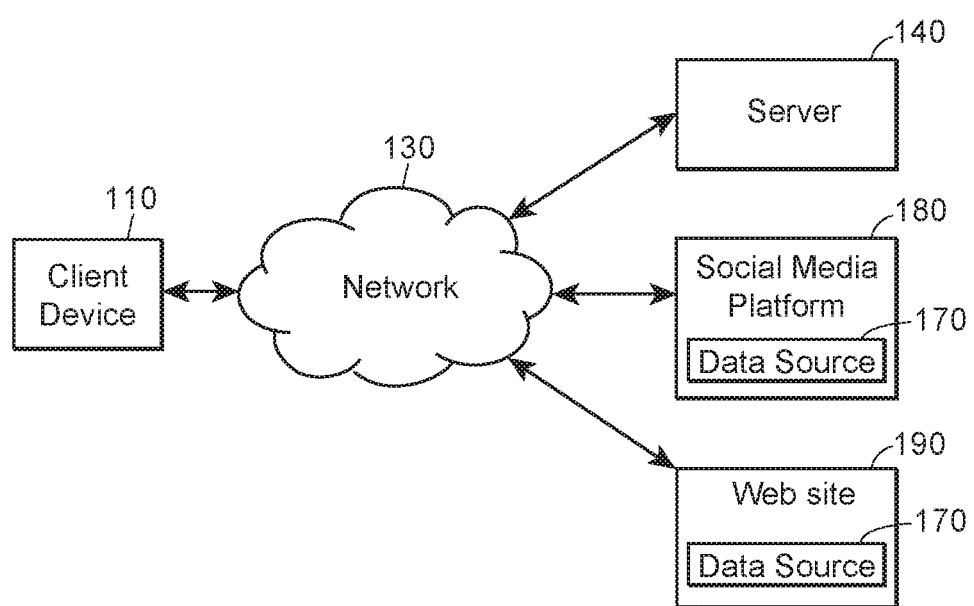
FIG. 2 illustrates another diagram of the exemplary user sentiment assessment system, particularly showing data sources.

FIG. 2 illustrates another diagram of the exemplary user sentiment assessment system 100, showing particular data sources 170. As discussed above, the client device 110 may be communicatively connected through the network 130 to the server 140 and to one or more data sources 170. The data sources 170 may be associated with the service provider, or they may be associated with third parties. Each social media platform 180 or web site 190 may have one or more data sources 170 that store received data and provide access to stored data. For example, posts of a plurality of users may be stored in the data source 170 associated with the social media platform 180, which may be searchable or otherwise selected and presented to a plurality of users of the social media platform 180. Such posts may be associated with individual users of the social media platform 180, including the user of the client device 110, and may be identified by user handles, tags, or other known means. Similarly, information associated with user accounts may be stored in the data source 170 associated with the web site 190. The web site 190 may present some or all of the information associated with a user account to the public or authorized users. For example, a user may create a public profile to be displayed through the web site 190, which may include a new feed, stream, or message list. Other user data, such as passwords, credit card information, address, or other sensitive information may be presented only to authorized users of the web site 190, such as the user with which such information is associated. Although the server 140, the social media platform 180, and the web site 190 are illustrated as separate components, it should be understood that any two or more of these may be combined in any combination. For example, the server 140 may be associated with a service provider and may serve a web site 190 associated with user accounts for clients of the service provider. Similarly, the social media platform 180 may include a web site 190 as a means of accessing the social media platform 180. Additionally, other similar third party components may be included in some embodiments of the system, including additional social media platforms 180, web sites 190, or other content sharing services (not shown). In some embodiments, such additional components may include e-mail, SMS text messaging services, chat services, audio- or video-conferencing services, or services providing similar communications capabilities.

Data Collection

The system described above may be used, as described further herein, to collect data associated with users of social media platforms 180 or other data sources 170. Such data may then be analyzed to determine one or more statuses associated with the user, which may then be further analyzed to determine appropriate action to better serve the user. Such data collection may include data scraping from third party data sources 170, such as social media platforms 180. For example, software programs or routines may be used to automatically access, parse, reformat, and store data from publically available social media platforms or web sites. Software such as Beautiful Soup (by Python Software Foundation) or Gumbo (by Apache Software Foundation) may be used to parse data from HTML-formatted data sources. Such data may include user identifiers (e.g., user handles, account names, etc.), locations associated with posts, text comprising the body of a post, tags associated with a post, embedded media associated with a post, metadata associated with a post (e.g., time, location, etc.), or other information associated with a post on a social media platform 180 or web site 190.

Figure 3:
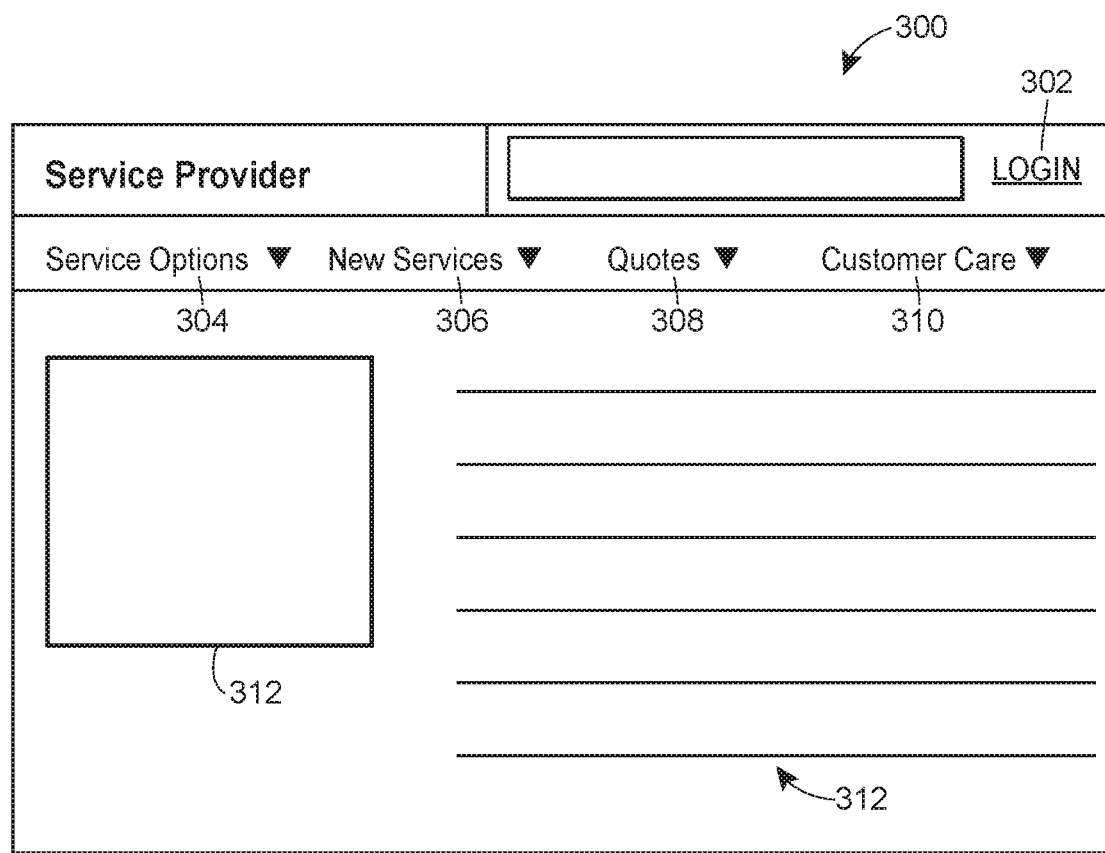
FIG. 3 illustrates an exemplary service provider web page, from which information regarding user interaction may be collected.

Additionally, or alternatively, data regarding user interaction with a web site or application associated with a service provider may also be collected. Such information may be particularly useful in determining the status of a user who is a client of the service provider. FIG. 3 illustrates an exemplary service provider web page 300, from which information regarding user interaction may be collected. The service provider web page 300 may be part of a web site 190 from which user data is collected. As shown, the service provider web page 300 may include a plurality of portions or sections 302-312. The exemplary web page 300 illustrates a login section 302 to allow a user to securely log into an associated user account with the service provider, a plurality of navigation option sections 304-310, and a page content section 312 that displays content specific to the particular web page accessed by the user. The navigation options may include any of a service options section 304 that allows the user to review and edit aspects of services received from the service provider, a new services section 306 that allows the user to obtain additional services from the service provider, a quotes section 308 that allows the user to request price or other quotes related to services from the service provider (e.g., insurance premium quotes), and a customer care section 310 that allows the user to obtain information or assistance regarding services provided by the service provider. The customer care section 310 may further allow the user to contact the service provider to submit complaints, service requests, claims (e.g., insurance claims), or reduce or terminate service.

Each section may be associated with a separate action, function, task, or purpose. Thus, information regarding the user's purpose for visiting the web page 300 may be obtained by identifying where the user's interaction with the web page 300 is focused. For example, the user may be interested in adding additional services if the user's interaction is focused on the new services section 306. Another user who interacts primarily with the customer care section 310, however, may be dissatisfied with some aspect of the service provided. Therefore, information regarding use interactions such as mouse hovering over a section 302-312, selecting a section 302-312, or total time spent on the web page 300 may be recorded by the server 140 in the database 146. In some embodiments, additional information regarding user interaction may be recorded if available, such as a location of a user gaze based upon images captured from a camera of the client device 110, duration of mouse-down events over sections, click duration, or duration of viewing a portion of the web page 300 within a window on the display 112 of the client device 110. Other similar data regarding user interaction with the web page 300 or the web site 190 may be similarly recorded, such as a user path through multiple pages of the web site 190. Although FIG. 3 is described as a web site, similar data may be recorded for user interaction with applications presenting similar information regarding a service provider, such as custom "apps" on a smartphone or tablet computer.

System Configuration and Training

In some embodiments, a configuration process may be implemented by a configuration module of the server 140 to prepare the server 140 to parse and analyze the data obtained from or regarding the user. Such configuration process may include specifying one or more models of an analysis module for assessing the received data. In some embodiments, the configuration module may include instructions causing the server to train one or more machine learning algorithms of an analysis module using known data to generate one or more models. Such machine learning algorithms may include any known or hereafter developed computer learning methods, such as support vector machines, random forests, artificial neural networks, etc. Similarly, the model may include any known or hereafter developed methods, including naïve Bayes classifiers, latent Dirichlet allocation, etc. For example, a first set of text-only posts on a social media platform that have been previously sorted may be provided to a machine learning program to develop a model, which may then be tested against a second set of training posts having known characteristics.

Figure 4:
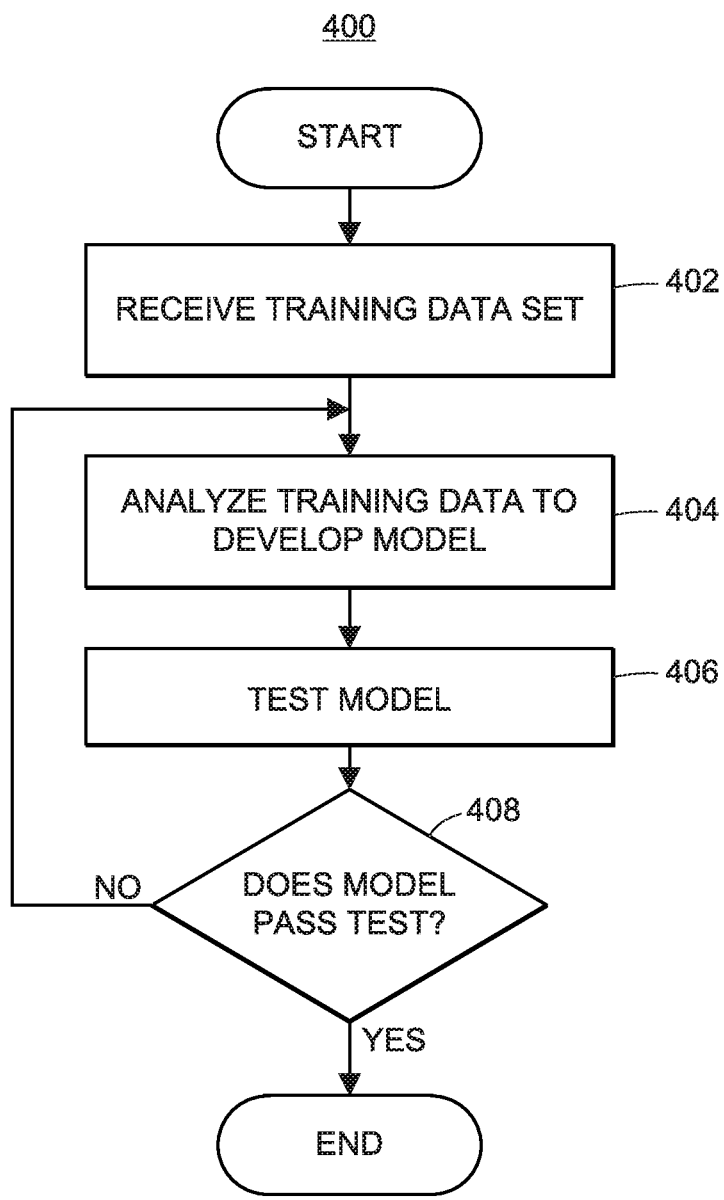
FIG. 4 illustrates a flow diagram of an exemplary training method for a machine learning program.

FIG. 4 illustrates a flow diagram of an exemplary training method 400 for a machine learning program. The method 400 may begin by receiving the training data (block 402), which may then be analyzed by one or more algorithms to generate one or more models (block 404). Each resulting model may then be tested (block 406) for accuracy, precision, reliability, robustness, or other similar measures of the predictive quality of the model. The model test results may then be compared against a threshold (block 408) to determine whether the model is of sufficient quality to analyze user data. If the model test results fail to meet the threshold requirement (block 408), the process may continue by receiving additional training data (block 402) or by continuing to analyze the test data (block 404) to improve the model quality. If the model test results meet the threshold requirement (block 408), the process may terminate and the model generated by the training method 400 may be stored in the program memory 160 or the database 146 for future use. In some embodiments, the configuration module may configure an analysis module of the server 140 for further use in processing and analyzing data from or regarding the user, as discussed further elsewhere herein.

User Sentiment Analysis and Attrition Prediction

Once the analysis module of the server 140 has been configured with one or more models for analyzing user data, the analysis module may be used to obtain and assess user data. In some embodiments, the analysis module may analyze user data to predict a likelihood of attrition by the user, i.e. the risk of the user discontinuing receiving one or more services from the service provider. Such attrition may take the form of cancelling future recurring orders, declining to renew a service, not requesting services in the future, or cancelling an insurance policy. To determine a user likelihood of attrition, the analysis module may analyze data from social media posts and/or web site usage to determine indications of user sentiment. Additionally, indications of user interaction with the service provides (such as through a web site or application) may be likewise determined and used to predict a likelihood of user attrition. Indications of user sentiment and interaction may then be further analyzed with additional information associated with the user (such as user profile data) to determine the likelihood of user attrition. User attrition may be predicted over one or more time periods (e.g., the next month or year, the period for renewal of a service contract or policy, etc.).

Figure 5:
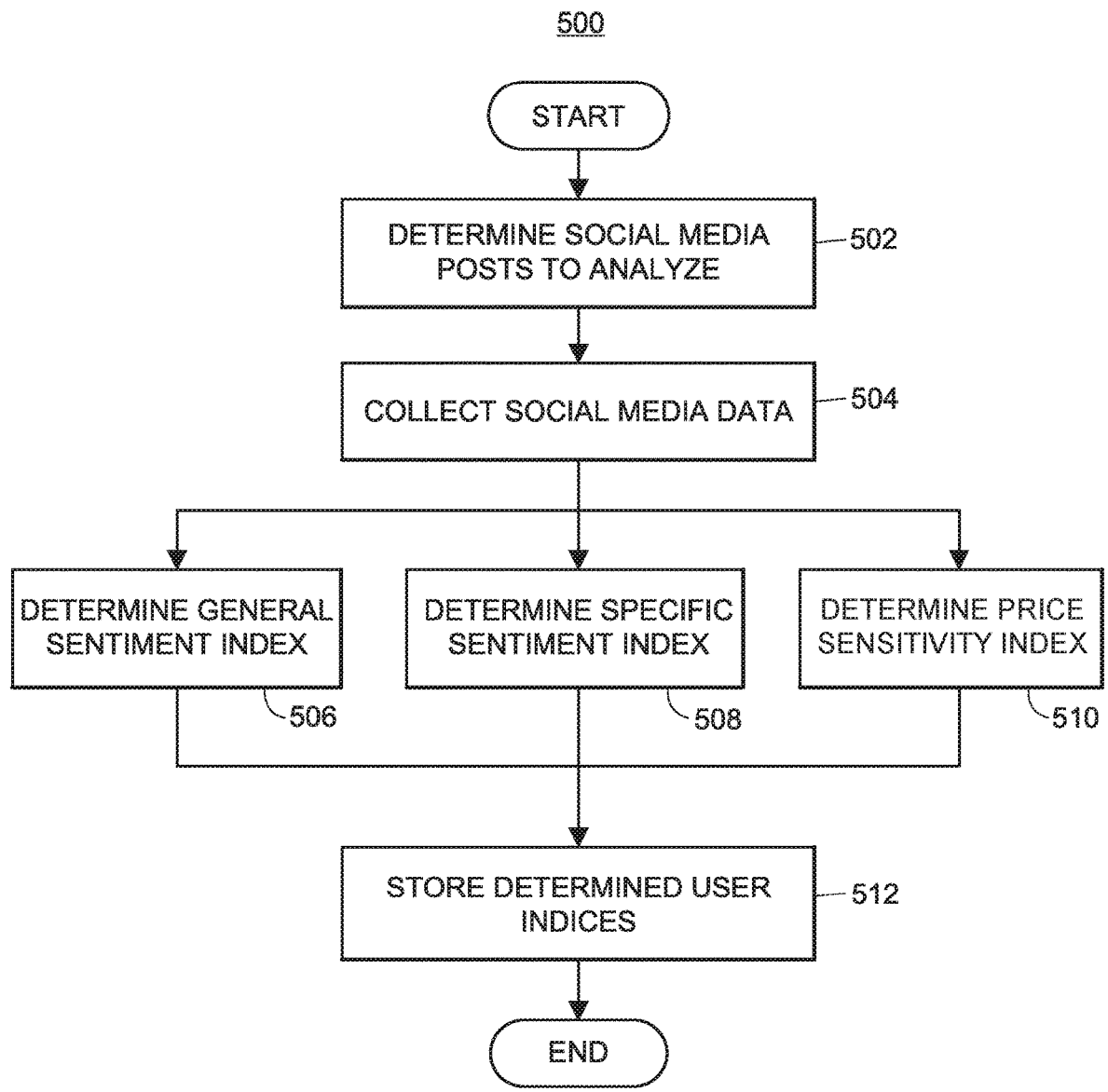
FIG. 5 illustrates a flow diagram of an exemplary user metric determination method.

FIG. 5 illustrates a flow diagram of an exemplary user metric determination method 500 that may be implemented by the analysis module of the server 140. The method 500 may analyze social media data (e.g., posts on a social media platform) in order to generate one or more of a general user sentiment index, a specific user sentiment index pertaining to the service provider, and/or a price sensitivity index of the user. One or more of these indices may be used to further determine a likelihood of user attrition. The method 500 may begin by determining social media posts to analyze (block 502). The posts to analyze may be determined by reference to the service provider, by a reference to a service offered by the service provider, by content within the post, or based upon an external factor (e.g., an upcoming renewal date for the user's service contract or policy). The method may continue with collection of social media data (block 504), including posts to be analyzed. The analysis module may apply one or more preconfigured models to determine one or more of the following: a general user sentiment index (block 506), a specific user sentiment index pertaining to the service provider (block 508), or a price sensitivity index of the user (block 510). Each determined index may then be stored in the program memory 160 or the database 146 (block 512) for further use, as discussed elsewhere herein.

At block 502, the method 500 may begin by determining social media posts to analyze. This may include periodic analysis of social media posts associated with users who are known customers or known previous customers of the service provider. For example, customers may elect to share social media identifiers (e.g., user names, handles, etc.) with the service provider in order to facilitate faster communication with the service provider. In some embodiments, known user accounts may be analyzed at times corresponding to service renewal, such as when an insurance policy is set to expire or renew within a time threshold of the current date (e.g., one month, two weeks, etc.). Additionally, or alternatively, the social media posts may be selected based upon searches for keywords or subject matter. For example, all posts directed to or mentioning the service provider may be identified by a search, and some or all of the identified posts may be further determined to be analyzed. Alternatively, posts may be identified as being directed to or mentioning a competitor of the service provider, and some or all of these identified posts may likewise be analyzed to determine whether the associated users have high likelihoods of attrition from the service provider or competitor service provider, in a manner analogous to that described further below. Other similar searching or filtering methods may be used to determine social media posts to analyze. In some embodiments, determining social media posts to analyze may include determining a social media user whose posts will be analyzed.

At block 504, the server 140 may collect social media data associated with the posts determined to be analyzed. This may include collecting the posts to be analyzed, as well as other posts by the same user in some embodiments. For example, once a first post by a user is determined to contain a reference to the service provider, the server 140 may collect a plurality (e.g., fifty) of previous or subsequent posts by the same user for analysis. Similarly, once a user is identified as nearing the end of a service contract (e.g., entering an insurance policy renewal period), the server 140 may collect a plurality of recent posts by the user (block 504). Metadata may likewise be collected regarding the posts, including time or location data. In some embodiments, the social media posts may include links or embedded content (e.g., audio, video, or images), which may be noted, collected, or converted by the server 140. Various methods of collecting (i.e., "scraping") social media data from web sites or other data sources 170 are known, as discussed above. The collected social media data may be stored in the program memory 160 or the database 146.

The server 140 may analyze the collected social media data to generate one or more indices associated with the user (blocks 506-510). The analysis module may retrieve or access one or more models previously configured by the configuration module for each such instance of analysis to generate an index. The analysis module may further parse or otherwise prepare some or all of the collected social media data for analysis.

At block 506, the analysis module of the server 140 may analyze the collected social media data to determine a general sentiment index associated with the user. This may include searching collected posts for keywords, phrases, syntax, or other content indicated by the relevant model as having a correlation with user sentiment. In some embodiments, the identified content may be categorized or associated with other content. For example, the text "superb" may be associated with "not" within the same post, which may cause the categorization or assessment of the post to be altered. In further embodiments, metadata or external data may further be associated with some or all of the posts. The analysis module 140 may then assess the social media data to determine one or more metrics of the user's general sentiment for the general sentiment index. This may include applying one or more machine algorithms to determine latent data associated with user sentiments from the collected data. In some embodiments, the analysis module may apply statistical techniques to fit the data derived from the social media posts to the one or more statistical models, including various regression or projection algorithms. The analysis module may further determine one or more aspects of user sentiment (e.g., satisfied, dissatisfied, upbeat, cynical, effusive, demanding, taciturn, etc.). In some embodiments, such analysis may give a score to one or more aspects of user sentiment, such as a ranking along a scale. In further embodiments, the one or more aspects may be used to determine a single score or category for the general user sentiment index.

At block 508, the analysis module of the server 140 may similarly analyze the collected social media data to determine a specific sentiment index associated with the user. This may likewise include searching collected posts for keywords, phrases, syntax, or other content indicated by the relevant model as having a correlation with user sentiment. In addition to the methods described above, the analysis module may further base the user's specific sentiment index in part upon information regarding the user's general sentiment index. In some embodiments, this may include generating a new model specific to the user by machine learning algorithms and methods using the information regarding the general user sentiment index as an input. Thereby, the analysis module may construct a model that analyzes the user's specific sentiment regarding the service provider relative to the user's baseline sentiment. For example, the same posts regarding the service provider may generate a specific sentiment index indicating a positive sentiment for the service provider for a user who is generally sparing in positive comments but may generate a specific sentiment index indicating a negative sentiment for the service provider for a user who is generally effusive in social media comments. Although specific sentiment index determination may thus benefit from information generated during general sentiment index determination, it should be understood that the analysis module may determine a specific sentiment index for a user without determining a general sentiment index in some embodiments.

In instances where the social media posts determined to be analyzed are associated with a competitor of the service provider, the specific sentiment index determined may similarly pertain to the competitor. In some embodiments, multiple specific sentiment indices pertaining to different service providers (which may include the service provider performing the analysis and one or more competitors) may be determined, which may involve performing the analysis of block 508 using different models associated with the different service providers.

At block 510, the analysis module may similarly determine a price sensitivity index for the user based upon the collected social media data. This may include parsing and modeling the data using algorithms or models relating to price information in a manner similar to that described above with respect to user sentiments. For example, the prevalence of terms such as "cheap," "expensive," "sale," "bargain," or related terms associated with prices in the collected social media posts of the user may indicate that the user is particular price conscious, which may be correlated with the user's price sensitivity. Thus, a price sensitivity index for the user may be determined based upon the social media data by statistical modeling.

At block 512, the one or more indices determined above may be stored in the program memory 160 or database 146 for further use. In some embodiments, the analysis module may verify validity or consistency of the one or more indices before storage. For example, the analysis module may check that each index value is within an appropriate range as a check that the process was run without errors. As another example, the analysis module may flag for further review unusually high or low index values that are within an allowable range but occur infrequently.

In addition to the social media data and user sentiments described above, the analysis module may further base predictions of user attrition upon information regarding user interaction with a web site or application associated with the service provider. For example, a sharp increase in user activity of a portion of the service provider's web site relating to pricing or complaints may indicate that the user is unsatisfied with the current service level or value offered by the service provider. Therefore, the analysis module may determine an indication of user purpose for interactions of the user with the service provider's web site or application, as described in FIG. 6. Such indications of user purpose may include or may be combined with indications of user interaction levels, such as frequency or duration of interaction of the user with the web site or application on one or more occasions during a measurement period (e.g., two weeks following a renewal notice being sent to the user).

Figure 6:
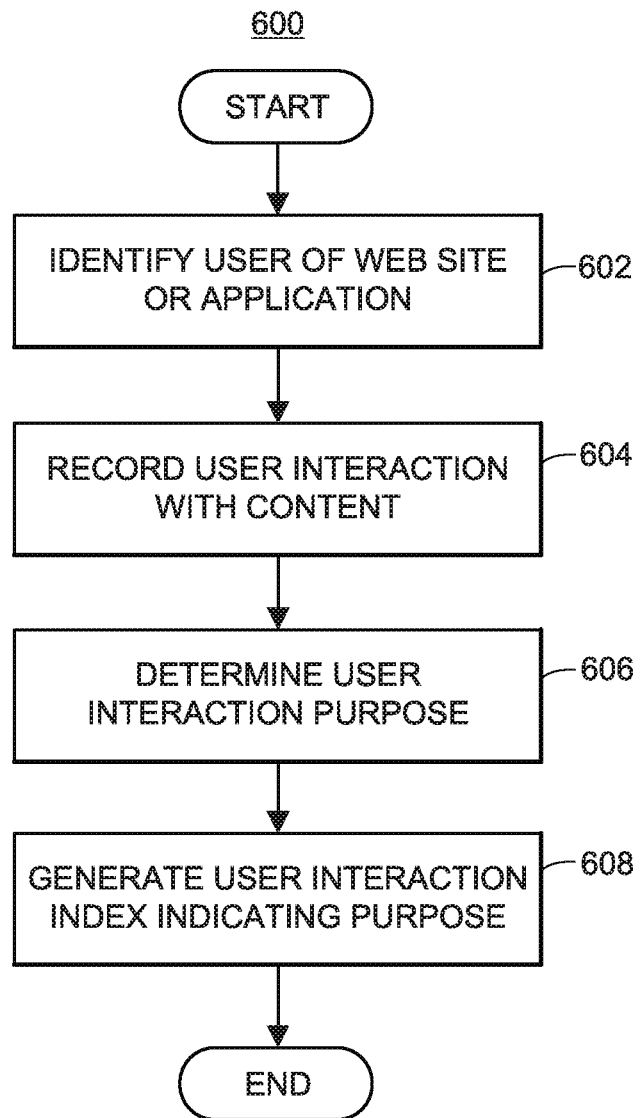
FIG. 6 illustrates a flow diagram of an exemplary embodiment of a user interaction assessment method.

FIG. 6 illustrates a flow diagram of an exemplary embodiment of a user interaction assessment method 600. The method 600 may begin by identifying a user of a service provider's application or web site 190 (block 602). The user's interaction with the content of the web site or application may then be monitored and recorded (block 604) until the user leaves the web site or application. The recorded data associated with the user's interactions may then be analyzed to determine one or more user interaction purposes (block 606). In some embodiments, an index may be generated to indicate the user purpose based upon the user's interactions with the web site or application (block 608). Such index may be incorporated into the prediction of user likelihood of attrition, as described below.

At block 602, the server 140 may identify a user of a service provider web site or application hosted by or communicating with the server 140. The user's identity may be established by a login event, such as when a user logs into an account with the insurance provider. Alternatively, the user's identity may be established based upon prior interactions (including a previous login) using cookies or other files stored on the client device 110, an IP address of the client device 110, or other known means.

At block 604, the server 140 may monitor and record user interactions with the web site or application. Such interactions may include a user path through a plurality of pages, as well as user interaction with each page. For example, user navigation through a frequently asked questions (FAQ) page to a page on service levels may strongly indicate that the user is interested in information relating to service levels because of the implication that the user searched out that information in the FAQ page. Data regarding user interaction with each web page or application screen may be collected as described above with respect to the web page 300. This may include identifying sections of a web page or application screen where the user is focused or through which the user interacts (e.g., by clicking a link, selecting an option button, entering data, etc.), as well as the duration of user interaction with part or all of the page or screen. The resulting data regarding user interaction with each web page or application screen may then be recorded in the database 146. In some embodiments, this user interaction data may be grouped into interaction sessions that may each represent one continuous visit to the service provider's web site or use of the service provider's application, which may be considered complete when the user navigates away from the web site or closes the web browser or application.

At block 606, the server 140 may determine one or more user interaction purposes for the interaction session based upon the interaction data recorded. This determination may be made at any time and, in some embodiments, may be delayed until a prediction of user likelihood of attrition is desired. To determine the user's interaction purposes for one or more interaction sessions, the analysis module may apply a statistical model of interaction data from a plurality of users. Such model may be generated by training supervised or unsupervised machine learning algorithms, as described above, to recognize latent explanatory variables or patterns in the interaction data. For example, interaction data indicating a longer user duration on web pages associated with service pricing or service renewal may be correlated with a user purpose of price comparison. Determined user purposes may include such purposes as obtaining general information, comparing prices, requesting service, or contacting the service provider, among others. In some embodiments, multiple user interaction purposes may be determined based upon the data for an interaction session. Additionally, user interaction purposes may be determined for a period of time (e.g., a week or month), as well as for individual interaction sessions.

At block 608, the server 140 may further generate a user interaction index indicating the determined purpose of the user's interaction with the web site or application over one or more interaction sessions. Such user interaction index may indicate a class of user interaction, such as general information, price comparison, service request, etc. In some embodiments, the index may further indicate the strength or degree of certainty of the determination of the user interaction purpose. The user interaction index may further indicate a combination of determined purposes from one or more interaction sessions, thereby providing further information regarding user interaction with the web site or application. Upon generating the user interaction index, the server 140 may store the user interaction index in the program memory 160 or the database 146 for further use.

Figure 7:
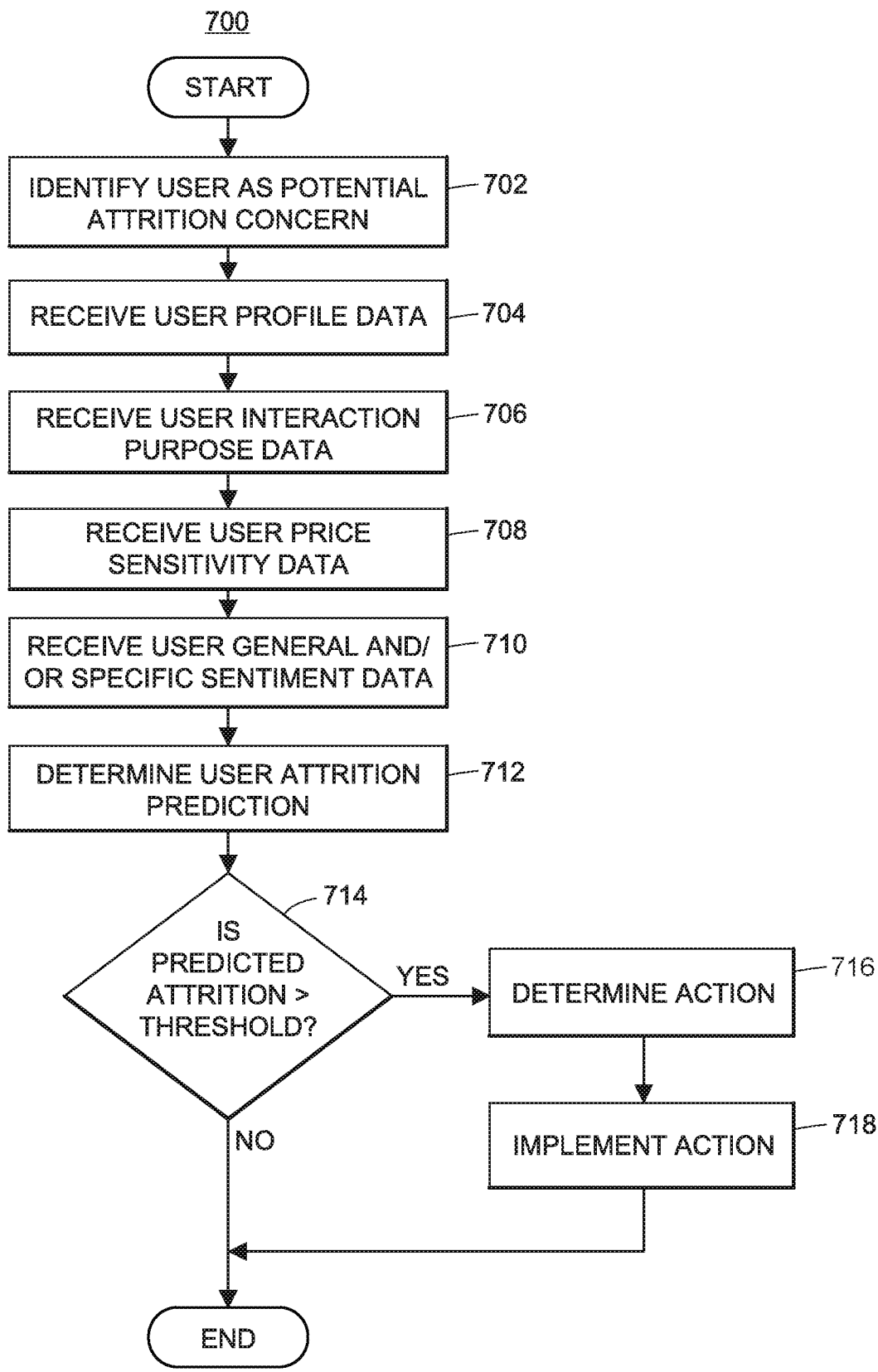
FIG. 7 illustrates a flow diagram of an exemplary attrition prediction method.

FIG. 7 illustrates a flow diagram of an exemplary attrition prediction method 700. The method 700 may begin by identifying a user as a potential attrition concern (block 702). Once the user is identified as an attrition concern, the analysis module of the server 140 may receive user profile data associated with the user (block 704), user interaction data (block 706), price sensitivity data (block 708), and/or general and/or specific sentiment data (block 710). From the received data, the analysis module may determine a prediction of the likelihood of user attrition over a relevant period (block 712). If the predicted likelihood of user attrition is determined to be above an action threshold (block 714), the server 140 may execute a response module to determine an action to take regarding the user (block 716) and implement the action (block 718). If the predicted likelihood of user attrition is determined not to be above the action threshold (block 714), the user may be judged not to be a significant attrition risk, and the method 700 may terminate. In some embodiments, the received data may be collected, determined, or generated as such data is needed during implementation of the method 700 using the methods described elsewhere herein.

At block 702, the server 140 may identify a user as a potential attrition concern. As discussed above, this may occur automatically based upon an occurrence of an event (e.g., a social media post of the user, a web site interaction of the user, etc.) or periodically based upon the user's service contract or policy (e.g., within a period of time prior to termination or renewal of the user's service contract or policy, annually, etc.). In addition, users may be identified based upon input from a customer service representative or other agent of the insurance provider (or a third party) as being a potential target for retention or acquisition efforts. In some embodiments, this may include determining that a user exhibits some indication associated with a risk of terminating the user's service contract or policy with a competitor of the service provider.

At block 704, the server 140 may access user profile data, if available. The user profile data may include publically or privately available information regarding the user, such as name, age, geographic location or market (e.g., urban, suburban, rural, etc.), criminal history, credit history, history with one or more service providers, or other similar information regarding the user. For example, the user profile of a current customer of an insurer may include one or more of the following: the customer's driving history, reported accidents and fault determinations, claims submitted, length of time as a customer, whether the customer has switched and returned to the insurer in the past, pending claims submitted by the customer, complaints made by the customer, payment history of the customer, or incentives and discounts included in the customer's policy. In some embodiments, the user profile data may be retrieved from a user profile (particularly for current clients of the service provider) stored in the database 146.

At block 706, the server 140 may access user interaction data relating to the user's interaction with the service provider web site or application. As discussed above, the interaction data may include a user interaction index for one or more interaction sessions in some embodiments. The user interaction data may be provided as an input into the analysis module or may be accessed by the analysis module in order to predict the user likelihood of attrition.

At block 708, the server 140 may access user price sensitivity data relating to the user's determined price sensitivity index. As discussed above, the user price sensitivity data may include a price sensitivity index associated with the user, which may be determined by analysis of social media posts. The user price sensitivity data may be provided as an input into the analysis module or may be accessed by the analysis module in order to predict the user likelihood of attrition.

At block 710, the server 140 may access data relating to the user's determined general sentiment and/or specific sentiment indices. As discussed above, this data may include one or more sentiment indices associated with the user, which may be determined by analysis of the collected social media data (including the user's social media posts). In some embodiments, this may include multiple specific sentiment indices of the user pertaining to the service provider and competing service providers. The user sentiment data may be provided as an input into the analysis module or may be accessed by the analysis module in order to predict the user likelihood of attrition.

At block 712, the analysis module of the server 140 may determine a prediction of the likelihood of user attrition, i.e., the probability that the user will terminate services with the user's current service provider within a relevant time period. The analysis module may determine this user attrition prediction using one or more models of attrition rates. These models may be generated by machine learning techniques and algorithms, as discussed above, using one or more of the user profile data, user interaction data, user price sensitivity data, and user sentiment data received above. For example, the user data may be assessed using a model (generated using latent Dirichlet allocation from a plurality of other users whose attrition decisions are known) to predict the likelihood of attrition for the identified user. By using user sentiment data and user interaction data, the determination by the analysis module of the server 140 may be more accurate. Also, separating the determination of the sentiment and price sensitivity data from determination of attrition may result in substantial processing speed improvements for determination of the user attrition prediction. In some embodiments, the prediction of attrition may further include a prediction class based upon the predicted likelihood. Such prediction class may be binary (e.g., the user is at risk of terminating service or is not at risk of terminating service) or may include three or more categories in various embodiments.

At block 714, the server 140 may determine whether the predicted likelihood of user attrition exceeds an action threshold. If the predicted likelihood of attrition does not exceed the action threshold, the method 700 may terminate. If the prediction likelihood does exceed the action threshold, the response module may be executed to determine an appropriate action (block 716) and cause such action to be implemented (block 718). At block 716, the response module may determine one or more actions to be taken in response to the user likelihood of attrition. Such actions may include generation of discounts or offers, alerts to customer service representatives or agents of the service provider, or advertising messages directed to the user. In some embodiments, the response module may determine that no action should be taken, such as where the user likelihood of attrition exceeds a no-action threshold. In such instances, the user may be determined to be highly likely to terminate service with the service provider regardless of actions taken by the service provider. Similar to the analysis module, the response module may generate or apply a model to the received data to determine the actions predicted to have the greatest impact on the likelihood of attrition. At block 718, the server 140 may cause the one or more actions to be implemented. This may include generating and transmitting messages or alerts, adjusting incentives or terms of service contracts (e.g., adding a discount to an insurance policy premium), or taking other actions. Following implementation of the actions, the method 700 may terminate.

User Sentiment Analysis and Prioritized Response

Figure 8:
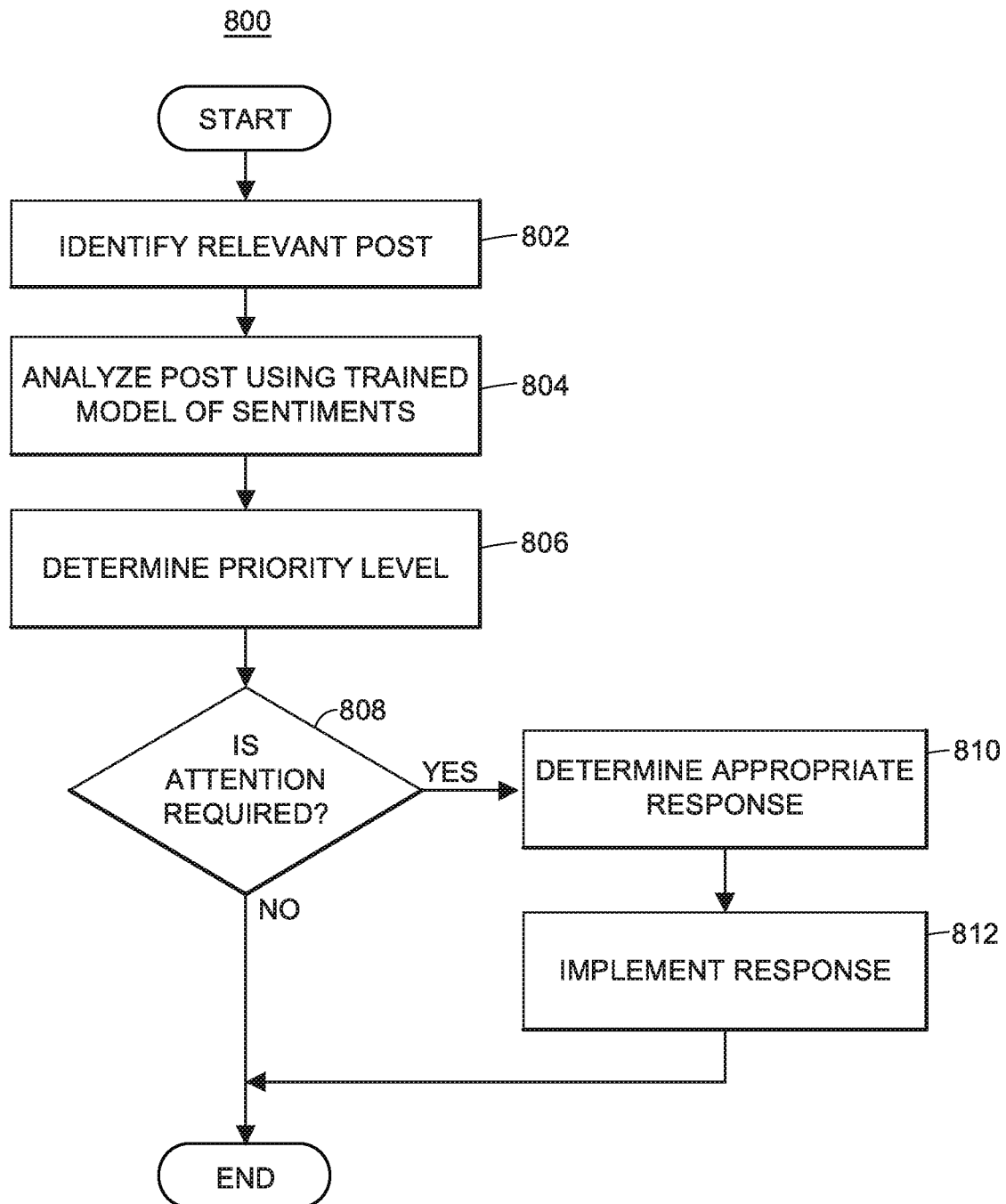
FIG. 8 illustrates a flow diagram of an exemplary prioritization and response method.
Figure 9:
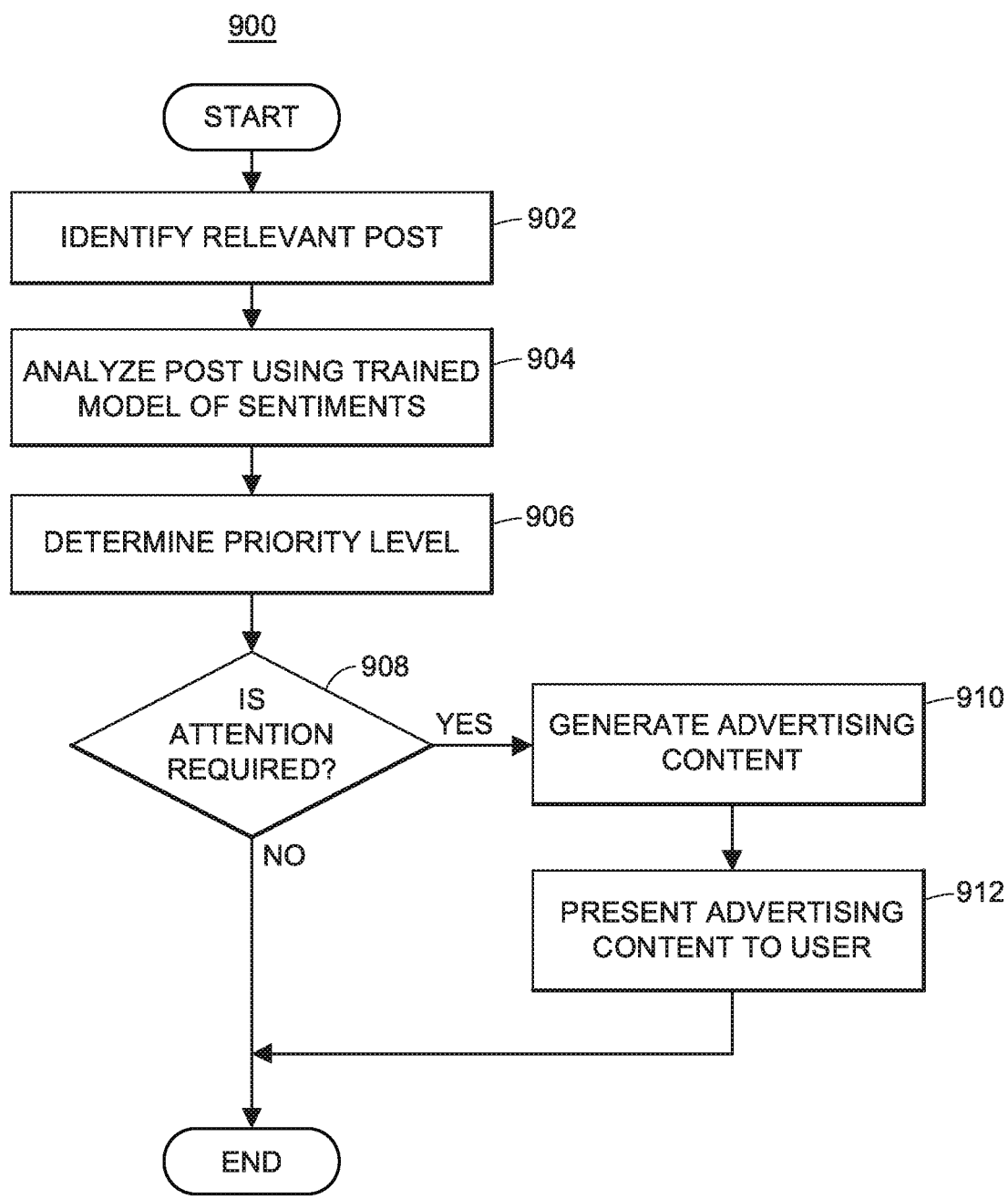
FIG. 9 illustrates a flow diagram of an exemplary prioritization and response method.

Analysis of user sentiments from social media posts may likewise be used to determine priority levels of and appropriate responses to users' social media posts. This may include identifying posts that may be of a sort requiring a response, such as posts directed to or mentioning the service provider. This may further include analyzing the posts using algorithms or models developed using machine learning techniques to determine the priority levels associated with each analyzed post. The posts may then be separated into a plurality of categories or levels requiring different types of responses, ranging from immediate agent action to taking no further action. FIGS. 8 and 9 illustrate flow diagrams of exemplary prioritization and response methods 800 and 900. The method 800 may be preferably implemented when the user associated with the social media post is a customer or client of the service provider, while method 900 may be preferably implemented when the user associated with the social media post is not a customer or client of the service provider (such as a customer of a competitor service provider).

The method 800 may begin by identifying a relevant social media post (block 802), which may then be analyzed (block 804) using one or more algorithms or models to determine user sentiments associated with the post. Based upon the analysis (block 804), a priority level may be determined for the post (block 806). If the priority level indicates that attention is required (block 808), an appropriate response may be determined (block 810) and implemented (block 812). The method 800 may terminate when the response is implemented or if no response is required.

At block 802, the analysis module of the server 140 may identify a relevant social media post. This may include searching posts for keywords, which may be identified using machine learning algorithms. Such keywords may include variations of the name or social media account name of the service provider, as well as other terms associated with the service provider (e.g., portions of slogans, mascots, or descriptions of advertising campaign features). Additionally, or alternatively, relevant posts may be determined based upon the recipient of the post, such as posts directed to the service provider's account.

At block 804, the analysis module may analyze the identified social media post to determine user sentiments associated therewith. Analyzing the social media post may include applying one or more models or algorithms to the contents of the post to determine latent variables associated with user sentiment, as discussed above. The models or algorithms may be trained in advance of such analysis using known data involving social media posts associated with known user sentiments or outcomes (e.g., continuation or discontinuation of service).

At block 806, the analysis module may further determine a priority level for the social media post based upon the determined user sentiments. In some embodiments, additional keyword or content analysis may be used to determine the priority level. In some embodiments, priority levels may include indications of both urgency and type. For example, types may include positive, negative, or neutral comments, questions, or unidentifiable posts. Similarly, urgency may indicate whether a post requires immediate attention, eventual action, an automated response, or no action. The combination of type and urgency in priority levels may facilitate more efficient sorting and handling of user posts relevant to the service provider, thereby allowing the service provider to ensure timely responses to user posts. For example, a post indicating that the user has been on hold for a long duration may be prioritized as both requiring immediate attention and negative. As another example, a post asking whether anyone knows how to contact the service provider may be prioritized as a neutral question.

At block 808, the analysis module may determine whether the priority level indicates that the social media post requires attention. This may include posts requiring either immediate attention or eventual action. In some embodiments this may further include posts requiring an automated response. If the post does not require attention, the method 800 may terminate.

If the post is determined to require attention, a response module of the server 140 may be executed to determine an appropriate response (block 810). The appropriate response may be determined based upon the priority level. Posts requiring immediate attention may be routed to a customer service representative or agent of the service provider for further action. In addition to the type determined for the post, the response module may determine the subject matter of the post in order to determine the appropriate response. For example, a post indicating that the user has been on hold for a long duration may be determined to involve telephone support and routed to a telephone operator for response. In some instances, the identity of the user may be determined and the call transferred from hold. As another example, a post asking whether anyone knows how to contact the service provider may be determined to be a request for general contact information by the response module, and generating an automatic message to the user with contact information may be determined to be the appropriate response. At block 812, the response module may cause the determined response to be implemented. As discussed above, this may include routing the message, transferring a user call, generating an automatic message, or taking other types of actions.

Similar to method 800 above, the method 900 may begin by identifying a relevant social media post (block 902), which may then be analyzed using one or more algorithms or models to determine user sentiments associated with the post (block 904). Based upon the analysis (block 904), a priority level may be determined for the post (block 906). If the priority level indicates that attention is required (block 908), one or more advertisements may be generated (block 910) and caused to be presented to the user (block 912). The method 900 may terminate when the messages are caused to be presented or if attention is not required.

At blocks 902, 904, and 906, the analysis module may perform functions similar to those discussed above with respect to blocks 802, 804, and 806 to identify a relevant post, analyze the post to determine an associated user sentiment, and determine a priority level for the post. In some embodiments, the analysis module may utilize different models or algorithms for competitor service providers at blocks 902, 904, and 906. At block 906, for example, the analysis module may determine a dissatisfaction level of the user as a component of the priority level.

At block 908, the analysis module may determine whether attention is required, as in block 808. The determination, however, may involve determining whether the user has a sufficiently high likelihood of attrition with respect to their current service provider, as discussed above. If no attention is required, the method 900 may terminate. If the analysis module determines that attention is required, the response module of the server 140 may be executed to generate advertising content (block 910) and cause the advertising content to be presented to the user (block 912). The advertising content may include one or more advertisements for the service provider, which may be general advertisements or may be associated with a particular issue identified in the user's post. In some embodiments, the advertisements may include a direct comparison of the service provider and the competitor service provider identified in the post. Causing the advertising content to be presented to the user may include purchasing advertising services from a third party, such as the social media platform, that will cause the advertisements to be presented to the user. For example, advertisements may be presented in sections of a web browser window adjacent to the social media post, but such sections may not become part of the social media record associated with the user. Once the server 140 has caused the advertising content to be presented (directly or by interaction with a third party server), the method 900 may terminate.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

What is claimed is:

1. A user sentiment assessment system for assessing user sentiment of a user of a social media platform, comprising:
   one or more processors;
   a program memory coupled to the one or more processors and storing executable instructions that, when executed by the one or more processors, cause the computer system to assess and respond to user sentiment by:
      accessing first and second training data sets each including a plurality of entries, each entry including a social media post and an indication associated with a known sentiment;
      determining one or more models based upon the first training data set;
      verifying, based upon the entries of the second training data set, the one or more models meet predetermined accuracy standards;
      identifying the user based upon one or more of the following: an interaction of the user with the service provider, a service renewal period associated with the user, or a keyword in a social media post by the user that indicates a subject matter associated with the service provider, wherein identifying the user includes determining a social media identifier associated with a user account of the user;
      obtaining a plurality of social media posts associated with the user from the social media platform based upon the social media identifier of the user, the plurality of social media posts including at least one social media post associated with a service provider and a plurality of social media posts unassociated with the service provider;
      generating a general user sentiment index by applying at least one of the one or more models to evaluate the plurality of social media posts unassociated with the service provider;
      generating a specific user sentiment index by applying at least one of the one or more models to evaluate the at least one social media post associated with the service provider;

predicting a likelihood of user attrition based upon the general user sentiment index and the specific user sentiment index;
determining whether the likelihood of user attrition exceeds a threshold; and
when the likelihood of user attrition exceeds the threshold:
  determining a response by applying at least one of the one or more models to evaluate the plurality of social media posts associated with the user; and
  implementing the determined response.

2. The user sentiment assessment system of claim 1, wherein the executable instruction further cause the computer system to:
receive user interaction data associated with interaction of the user with at least one of a web site or software application associated with the service provider; and
generate a user interaction index indicating a purpose of the interaction; and
wherein the likelihood of user attrition is predicted further based upon the user interaction index.

3. The user sentiment assessment system of claim 2, wherein the interaction data includes data regarding a user path through a plurality of pages or views of the web site or software application.

4. The user sentiment assessment system of claim 1, wherein:
the executable instruction further cause the computer system to generate a price sensitivity index associated with the user by applying at least one of the one or more models to evaluate the plurality of social media posts associated with the user; and
the likelihood of user attrition is predicted further based upon the price sensitivity index.

5. The user sentiment assessment system of claim 4, wherein:
the plurality of social media posts associated with the user each include metadata associated with the respective social media post, the metadata including at least one of the following: a time or a location associated with the respective social media post; and
the one or more models use the metadata in generating at least one of the general user sentiment index, the specific user sentiment index, or the price sensitivity index.

6. The user sentiment assessment system of claim 1, wherein:
determining the response further includes, when the likelihood of user attrition exceeds the threshold, determining a priority level indicating an urgency associated with the at least one social media post associated with a service provider by applying at least one of the one or more models to evaluate the at least one social media post associated with the service provider; and
the response is further determined based upon the priority level.

7. The user sentiment assessment system of claim 6, wherein the response includes routing an indication associated with the at least one social media post associated with a service provider to a customer service representative of the service provider to assist the user when the priority level indicates high urgency.

8. A computer-implemented method for assessing user sentiment of a user of a social media platform, comprising:
obtaining, by one or more processors, one or more models for user data analysis;
identifying, by one or more processors, the user based upon one or more of the following: an interaction of the user with a service provider, a service renewal period associated with the user, or a keyword in a social media post by the user that indicates a subject matter associated with the service provider, wherein identifying the user includes determining a social media identifier associated with a user account of the user;
obtaining, by one or more processors, a plurality of social media posts associated with the user from the social media platform based upon the social media identifier of the user, the plurality of social media posts including at least one social media post associated with the service provider and a plurality of social media posts unassociated with the service provider;
generating, by one or more processors, a general user sentiment index by applying at least one of the one or more models to evaluate the plurality of social media posts unassociated with the service provider;
generating, by one or more processors, a specific user sentiment index by applying at least one of the one or more models to evaluate the at least one social media post associated with the service provider;
predicting, by one or more processors, a likelihood of user attrition based upon the general user sentiment index and the specific user sentiment index;
determining, by one or more processors, that the likelihood of user attrition exceeds a threshold;
determining, by one or more processors, a response by applying at least one of the one or more models to evaluate the plurality of social media posts associated with the user; and
implementing, by one or more processors, the determined response.

9. The computer-implemented method of claim 8, wherein obtaining the plurality of social media posts associated with the user includes:
determining a user indicator identifying the user on the social media platform; and
identifying the social media posts based upon the user indicator from among a plurality of public posts on the social media platform associated with a plurality of users of the social media platform.

10. The computer-implemented method of claim 8, wherein obtaining the one or more models for user data analysis includes:
accessing, from a database communicatively connected to one or more processors, first and second training data sets each including a plurality of entries, each entry including a social media post and an indication associated with a known sentiment;
determining, by one or more processors, the one or more models based upon the first training data set; and
verifying, by one or more processors and based upon the entries of the second training data set, the one or more models meet predetermined accuracy standards.

11. The computer-implemented method of claim 8, further comprising:
receiving, at one or more processors, user interaction data associated with interaction of the user with at least one of a web site or software application associated with the service provider; and
generating, by one or more processors, a user interaction index indicating a purpose of the interaction, and
wherein the likelihood of user attrition is predicted further based upon the user interaction index.

12. The computer-implemented method of claim 8, further comprising:
generating, by one or more processors, a price sensitivity index associated with the user by applying at least one of the one or more models to evaluate the plurality of social media posts associated with the user, and
wherein the likelihood of user attrition is predicted further based upon the price sensitivity index.

13. The computer-implemented method of claim 12, wherein:
the plurality of social media posts associated with the user each include metadata associated with the respective social media post, the metadata including at least one of the following: a time or a location associated with the respective social media post; and
the one or more models use the metadata in generating at least one of the general user sentiment index, the specific user sentiment index, or the price sensitivity index.

14. The computer-implemented method of claim 8, wherein:
determining the response further includes determining a priority level indicating an urgency associated with the at least one social media post associated with a service provider by applying at least one of the one or more models to evaluate the at least one social media post associated with the service provider; and
the response is further determined based upon the priority level.

15. The computer-implemented method of claim 8, wherein the response includes routing an indication associated with the at least one social media post associated with a service provider to a customer service representative of the service provider to assist the user.

16. A tangible, non-transitory computer-readable medium storing instructions for assessing user sentiment of a user of a social media platform that, when executed by at least one processor of a computer system, cause the computer system to:
obtain one or more models for user data analysis;
identify the user based upon one or more of the following: an interaction of the user with a service provider, a service renewal period associated with the user, or a keyword in a social media post by the user that indicates a subject matter associated with the service provider, wherein identifying the user includes determining a social media identifier associated with a user account of the user;
obtain a plurality of social media posts associated with the user from the social media platform based upon the social media identifier of the user, the plurality of social media posts including at least one social media post associated with the service provider and a plurality of social media posts unassociated with the service provider;
generate a general user sentiment index by applying at least one of the one or more models to evaluate the plurality of social media posts unassociated with the service provider;
generate a specific user sentiment index by applying at least one of the one or more models to evaluate the at least one social media post associated with the service provider;
predict a likelihood of user attrition based upon the general user sentiment index and the specific user sentiment index;
determine that the likelihood of user attrition exceeds a threshold;
determine a response by applying at least one of the one or more models to evaluate the plurality of social media posts associated with the user; and
implement the determined response.

17. The tangible, non-transitory computer-readable medium of claim 16, wherein the instructions that cause the computer system to obtain the one or more models for user data analysis further include instructions that cause the computer system to:
access first and second training data sets each including a plurality of entries, each entry including a social media post and an indication associated with a known sentiment;
determine the one or more models based upon the first training data set; and
verify, based upon the entries of the second training data set, the one or more models meet predetermined accuracy standards.

18. The tangible, non-transitory computer-readable medium of claim 16, further storing instructions that cause the computer system to:
receive user interaction data associated with interaction of the user with at least one of a web site or software application associated with the service provider; and
generate a user interaction index indicating a purpose of the interaction, and
wherein the likelihood of user attrition is predicted further based upon the user interaction index.

19. The tangible, non-transitory computer-readable medium of claim 16, further storing instructions that cause the computer system to:
generate a price sensitivity index associated with the user by applying at least one of the one or more models to evaluate the plurality of social media posts associated with the user, and
wherein:
the likelihood of user attrition is predicted further based upon the price sensitivity index;
the plurality of social media posts associated with the user each include metadata associated with the respective social media post, the metadata including at least one of the following: a time or a location associated with the respective social media post; and
the one or more models use the metadata in generating at least one of the general user sentiment index, the specific user sentiment index, or the price sensitivity index.

20. The tangible, non-transitory computer-readable medium of claim 16, wherein:
determining the response further includes determining a priority level indicating an urgency associated with the at least one social media post associated with a service provider by applying at least one of the one or more models to evaluate the at least one social media post associated with the service provider; and
the response is further determined based upon the priority level.

* * * * *

UNITED STATES PATENT AND TRADEMARK OFFICE
CERTIFICATE OF CORRECTION

| | |
|---|---|
| PATENT NO. | : 10,635,987 B1 |
| APPLICATION NO. | : 15/340539 |
| DATED | : April 28, 2020 |
| INVENTOR(S) | : Jerry Chen et al. |

It is certified that error appears in the above-identified patent and that said Letters Patent is hereby corrected as shown below:

On the Title Page

At Column 1, below item (72), please insert, -- (73) Assignee: STATE FARM MUTUAL AUTOMOBILE INSURANCE COMPANY, Bloomington, IL (US) --.

Signed and Sealed this
Thirteenth Day of October, 2020

Andrei Iancu
*Director of the United States Patent and Trademark Office*